March 17, 1964 W. R. FOX ETAL 3,125,086
CONTROL MECHANISM FOR PRESSURE CHARGED
INTERNAL COMBUSTION ENGINE
Filed Sept. 12, 1961 4 Sheets-Sheet 1

INVENTORS
William R. Fox,
Richard J. Hames,
Frederick Schwartz
BY & Karl Zaruba

C. C. James
ATTORNEY

INVENTORS
William R. Fox,
Richard J. Hames,
Frederick Schwartz
& Karl Zaruba
BY
E. E. James
ATTORNEY INVENTORS
William R. Fox,
Richard J. Hames,
Frederick Schwartz
& Karl Zaruba
BY
E. E. James
ATTORNEY March 17, 1964

W. R. FOX ETAL 3,125,086

CONTROL MECHANISM FOR PRESSURE CHARGED
INTERNAL COMBUSTION ENGINE

Filed Sept. 12, 1961

INVENTORS
William R. Fox,
Richard J. Hames,
Frederick Schwartz
BY & Karl Zaruba

C. C. James

ATTORNEY

United States Patent Office 3,125,086
Patented Mar. 17, 1964

3,125,086
CONTROL MECHANISM FOR PRESSURE CHARGED INTERNAL COMBUSTION ENGINE
William R. Fox, Wayne, Richard J. Hames, Livonia, and Frederick Schwartz and Karl Zaruba, Detroit, Mich., assignors to General Motors Corporation, Detroit, Mich., a corporation of Delaware
Filed Sept. 12, 1961, Ser. No. 137,665
6 Claims. (Cl. 123—140)

This invention relates generally to control mechanisms for an internal combustion engine; more particularly to control mechanisms for regulating both fuel and air supply to a pressure charged internal combustion engine; and with regard to certain of its more specific aspects, to a control mechanism operable to regulate the fuel and scavenging air supply to a two-cycle compression ignition engine having an engine driven positive displacement blower and pressurized fuel injection into its several cylinders.

The invention contemplates an improved engine control mechanism including a valve controlled blower bypass operable within governor maintained idle and maximum speed limits to modulate the supply of pressurized air to an internal combustion engine in accordance with the scavenging and combustion air requirements indicated by manual adjustment of an engine fuel supply throttle control and by effected changes in the engine speed and load conditions. Such modulation of the pressurized air supply serves to substantially reduce the blower driving power required during part throttle operation and thus increases overall operating efficiency and fuel economy in variable speed engine installations such as motor vehicles.

With regard to certain of its more specific aspects, the invention further contemplates a relatively simple blower bypass control mechanism capable of inexpensive field service integration with a minimum of additional or alternate parts, into a compound blower and centrifugal mechanism such as shown and described in copending United States patent applications Serial No. 13,490, filed March 8, 1960, now Patent 3,014,475 issued December 26, 1961 in the names of Charles H. Frick et al., and entitled "Control Mechanism for V-Type Internal Combustion Engine," and Serial No. 2,057, filed January 12, 1960, in the names of William R. Fox et al., and entitled "Combined Engine Accessory Drive and Housing Therefor," now Patent 3,088,446, issued May 7, 1963.

The foregoing and other objects, advantages and features of the invention will be apparent from the following description of a preferred illustrative embodiment of the invention, having reference to the accompanying drawings, in which.

Figure 5:
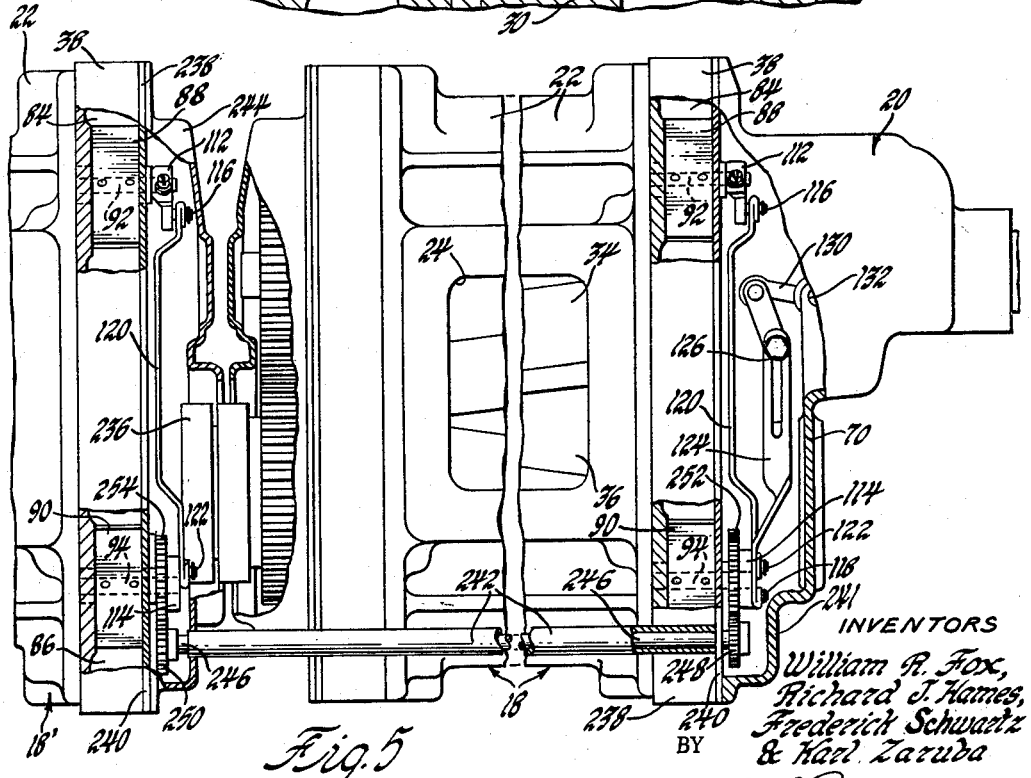
FIGURE 5 is a fragmentary elevational view of a modified form of the invention with portions thereof broken away and in section as incorporated in a tandem blower installation.
Figure 6:
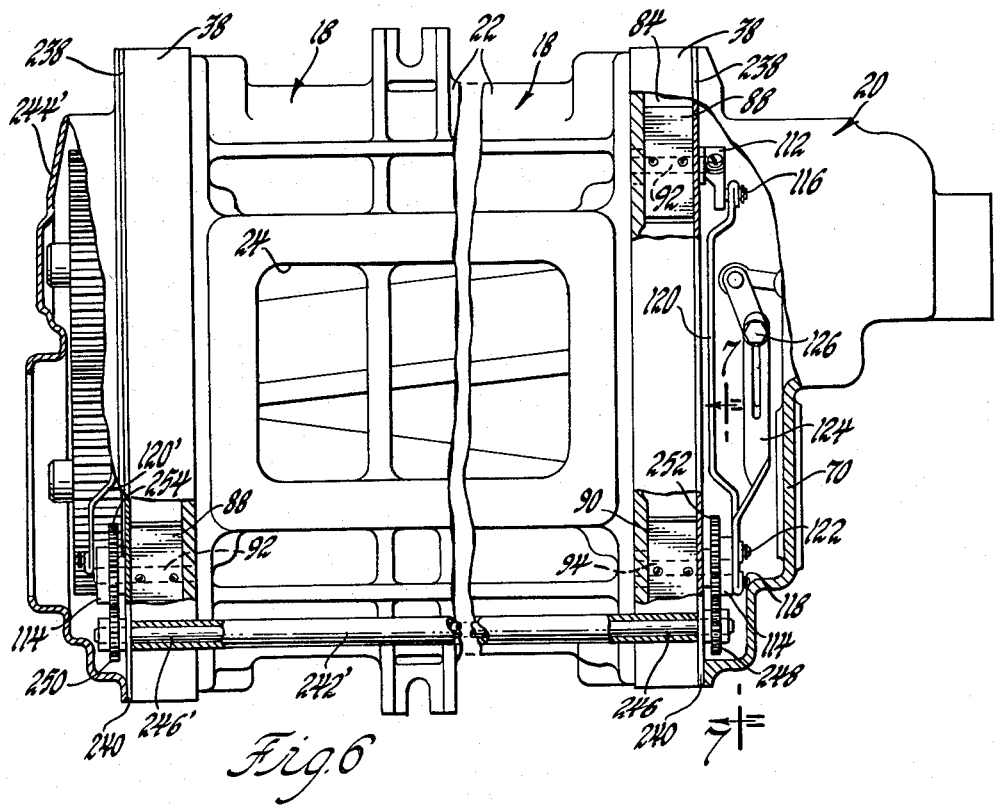
FIGURE 6 is a view similar to FIGURE 5 showing another modification of the invention.
Figure 7:
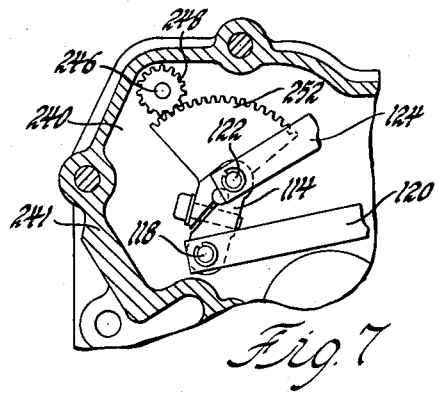
Figure 8:
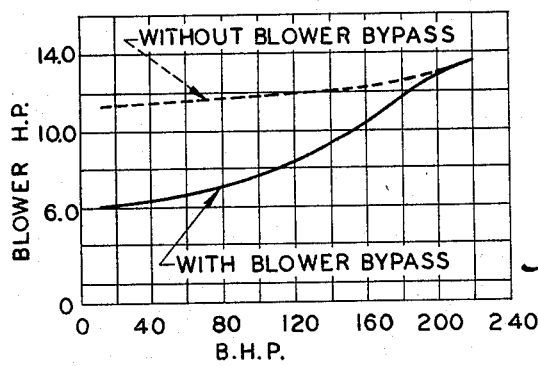

FIGURE 7 is a fragmentary sectional view showing certain details common to the modified forms of the invention shown in FIGURES 5 and 6 and is taken substantially in the direction of the arrows and in the plane of the line indicated at 7—7 of FIGURE 6; and FIGURE 8 is a graph showing the reduced blower driving power required by operation of the control mechanism of the invention in a typical engine installation in contrast to that required in the absence of such a control mechanism.

Referring more particularly to FIGURES 1–4 of the drawings, a V-type two-cycle uniflow scavenged internal combustion engine is indicated generally by the reference numeral 10 and includes a cylinder block 12 and two cylinder heads 14 mounted thereon in V'd spaced relation to each other. A combined blower and accessory drive unit 16 is mounted on the upper deck of the cylinder block intermediate the V'd cylinder heads. This accessory drive unit is adapted to be driven in timed relation to the engine and includes a Roots type positive displacement blower 18 and a limiting speed centrifugal governor 20.

The blower 18 includes an intermediate housing member 22 having an air inlet at 24. A pressurized air outlet 26 is connected through a port 28 to a scavenging air box 30 which is defined by and extends longitudinally of the cylinder block. Two end plates are secured to opposite ends of the housing member 22 and cooperate therewith to define a blower compartment or chamber 32 wherein two intermeshed and cooperating three-lobed helical impellers 34 and 36 of Roots type cross-section are rotatably mounted. These two impellers are synchronously driven to provide pumping displacement of air from the compressor inlet 24 through its pressure outlet to the air box of the engine.

In the illustrative embodiment, a perforated end plate 38 is secured to the governor mounting end of the blower housing member 22 in place of the end plate shown in the aforementioned patent applications. The end plate 38 has a peripheral flange 40 mating with the adjacent end of the blower housing member 22. A web 42 extends transversely of the end plate and defines the end wall of the blower compartment 32. A reinforcing boss or rib 44 vertically intersects the peripheral flange and web and is drilled to receive a bolt 46 securing the end plate to the cylinder block. Two spaced cylindrical hubs or flanges 48 and 50 extend from the central portion of the web 42 and are connected by a partition web or boss 52 extending therebetween. These cylindrical flanges internally mount roller bearings 54 and 56 which journal stub shafts 58 and 60 carried by and projecting from the adjacent ends of the impellers 34 and 36, respectively. The bearings 54 and 56 are suitably sealed with respect to the blower compartment by annular seals 62 interposed between the impeller shafts and the cylindrical flanges 48 and 50.

The end faces of the peripheral and cylindrical flanges 40, 48 and 50 and of the boss 52 are coplanar and sealingly engage a relatively thin partition plate member 64. This partition plate is perforated to provide two openings 66 and 68 coaxially alignable with the bearing mounting bores of the cylindrical flanges 48 and 50, respectively. A governor housing member 70 sealingly engages the outer periphery of the plate 64 and together with the partition plate 64 and the blower end plate member 38 is aligned with and secured to the intermediate blower housing member by a plurality of dowel pins 72 and bolts 74. The partition plate is also sealingly secured adjacent its openings 66 and 68 to the mating adjacent cylindrical flanges of the end plate by a plurality of bolts 75, several of which mount bearing retaining clips 75'.

The upper portion of the end plate web 42 is perforated at 76 and 78 to define two pressure bypass outlet ports communicating with the air inlet zone of the blower compartment and the lower web portion is similarly perforated at 80 and 82 to provide pressure bypass inlet ports communicating with the pressure outlet zone of the blower compartment. The blower end plate 38 and the plate member 64 thus cooperate to define two bypass passages 84 and 86 extending arcuately around the cylindrical flanges and interconnecting the pressure bypass inlet and outlet ports. Bypass air flow through these passages is regulated by rotative positioning of two plate type valves 88 and 90 in accordance with the fuel regulating output of the limiting speed centrifugal governor 20. The valves 88 and 90 are interconnected through suitable linkages to the limiting speed governor 20 in the governor housing 70 and to a throttle control means which is normally operable to regulate the engine fuel supply between governor maintained idle and maximum speed limits.

The valves 88 and 90 consist of rectangular plates secured respectively to pivot shafts 92 and 94. These shafts are journaled by suitably sealed anti-friction bearings 95 mounted in aligned openings 96, 98 and 100, 102 in the end and partition plate members 38 and 64. The valve plates 88 and 90 have axial sealing clearances with the adjacent surfaces of the end and partition plate members and are rotatable between opened and closed positions shown respectively in full and broken lines in FIGURE 4. When in their closed positions, the opposite radial ends of these valve plates have radial sealing clearances with oposing seal lands 104, 106 and 108, 110 cut arcuately in the peripheral and cylindrical flanges of the end plate member 38.

The bypass valve actuating linkage includes two levers 112 and 114 which are adjustably secured on the ends of the pivot shafts 92 and 94 projecting into the governor housing compartment. These levers are pivotally connected at 116 and 118, respectively, to opposite ends of a tie link 120. A second arm of the lever 114 is pivotally connected at 122 to one end of a two-piece tie link 124. This tie link has a slot and bolt clamping adjustment 126 between its end pieces. The opposite end of the tie link 124 is pivotally connected at 128 to one arm of the fuel supply regulating output lever 130 of the governor. The lever 130 is pivotally supported equidistant between its ends by a pin 132 which is in turn supported by two vertically spaced bosses 134 which are integral with and project laterally within the governor housing.

In addition to its connection to the bypass valve actuating linkage, the lever 130 is also pivotally connected at 128 to one end of a link 136. This link is connectable at its distal end to fuel supply controlling mechanism associated with the left cylinder head as viewed in FIGURES 2 and 4. The other arm of the lever 130 is pivotally connected at 138 to one end of a second link 140 which is connectable at its distal end to the fuel supply controlling mechanism associated with the right cylinder head. The lever 130 thus normally serves to equalize the fuel supply controlling movements of the links 136 and 140 and thereby the operation of the fuel supply controlling mechanisms associated with the left and right cylinder heads, respectively. The pivot 138 is also connected to one end of an actuating tie link 142. The opposite end of the link 142 is pivotally connected at 144 to one arm of a floating differential lever 146 which is movable to adjust engine fuel supply and bypass valve opening in accordance with the manual adjustment of the throttle control linkage and the speed responsive action of the governor.

The limiting speed centrifugal governor 20 includes a flyweight driving shaft 148. This shaft is drivingly splined at 150 to the impeller stub shaft 58 and is thus driven by the engine through the blower at a fixed ratio to engine speed, e.g. 2:1. The opposite end of the shaft 148 is journaled by a ball bearing 152. The inner race of the ball bearing embraces the end of the shaft 148 and is retained thereon by a bolt 154. The outer race of the bearing is mounted within a counterbore 156 in the governor housing and is retained therein by a closure plug 158. A flyweight carrier 160 is secured to the shaft adjacent its splined end and pivotally mounts low and high speed weights 162 and 164 for centrifugal outward swinging movement about pivot pins 168. The low speed weights 162 are of substantially greater mass than the high speed weights and each has a pickup boss 170. These pickup bosses are adapted to engage and carry the high speed weights 164 centrifugally outwardly during low speed operation until stop pads 172 on the low speed weights are brought into abutment with the hub 174 of the flyweight carrier 160. A lever arm 176 extends radially inwardly of each of the high speed weight members and thrustably engages the adjacent end of a riser sleeve 178 which is slidably mounted on the shaft 148. The opposite end of the riser sleeve thrustably engages a ball bearing 180 which in turn engages the yoked arms of a lever 182.

The lever 182 is secured to the lower end portion of a governor power shaft 184 which is suitably journaled adjacent its upper and lower ends within spaced housing portions indicated at 186 and 188. A bell crank lever 190 secured to the upper end of the shaft 184 has a first arm 192 threadably mounting an adjustable nut-locked bolt 194. This bolt thrustably engages a spring seating cap 196 of a speeder spring assembly 198. A second arm 200 of the bell crank lever 190 carries a pin 202 pivotally mounting the differential lever 146 intermediate its ends. The arm of the differential lever 146 opposite its pivotal connection at 144 to the tie link 142 is slotted to provide a lost motion pivotal connection with a pin 204 carried by a lever arm 206 of a throttle control lever assembly 208.

The throttle control lever 208 includes a shaft 210 which is pivotally mounted in and extends through a cover plate 212 closing an opening 214 in the upper portion of the governor housing. The lever arm 206 is suitably secured to the lower end of the shaft 210 within the governor housing compartment and a second lever arm 216 is secured to its upper end above the cover plate. The lever arm 216 is pivotally connected at 218 to an operator actuated linkage partially indicated at 220. The linkage 220 is operable to effect movement of throttle control lever between minimum idle and full-fuel, wide-open-throttle positions. The throttle control lever 208 is thus normally operable on the fuel control linkage through the differential lever 146 to control the fuel supply and thereby engine speed and torque between the governor maintained idle and maximum speed limits.

The speeder spring assembly 198 is preferably of the type shown and described in the above mentioned S.N. 13,490 patent application, having coaxial idle speed and maximum speed establishing speeder springs. The speeder spring assembly normally biases the fuel controlling linkage in an increasing fuel direction in opposition to the fuel decreasing biasing action of the flyweights 162 and 164 and normally urges the blower air bypass valves 88 and 90 toward their closed positions. Under engine idle speed conditions with the throttle control lever 208 in its minimum fuel supply controlling position, an equilibrium condition is obtained between the idle speeder spring and the centrifugal forces acting on the flyweights 162 and 164. Any tendency of the engine to vary from the idle speed limit due to the application or removal of the load torque results in a corresponding shifting of the fuel control linkage until a new equilibrium condition is obtained between the flyweights and the idler spring thus maintaining the desired idle speed. During such idle speed operation, the fuel supply controlling range of movement of the governor output lever 130 is normally such that the bypass valves are actuated to their bypass opened positions shown in FIGURE 4.

Figure 1:
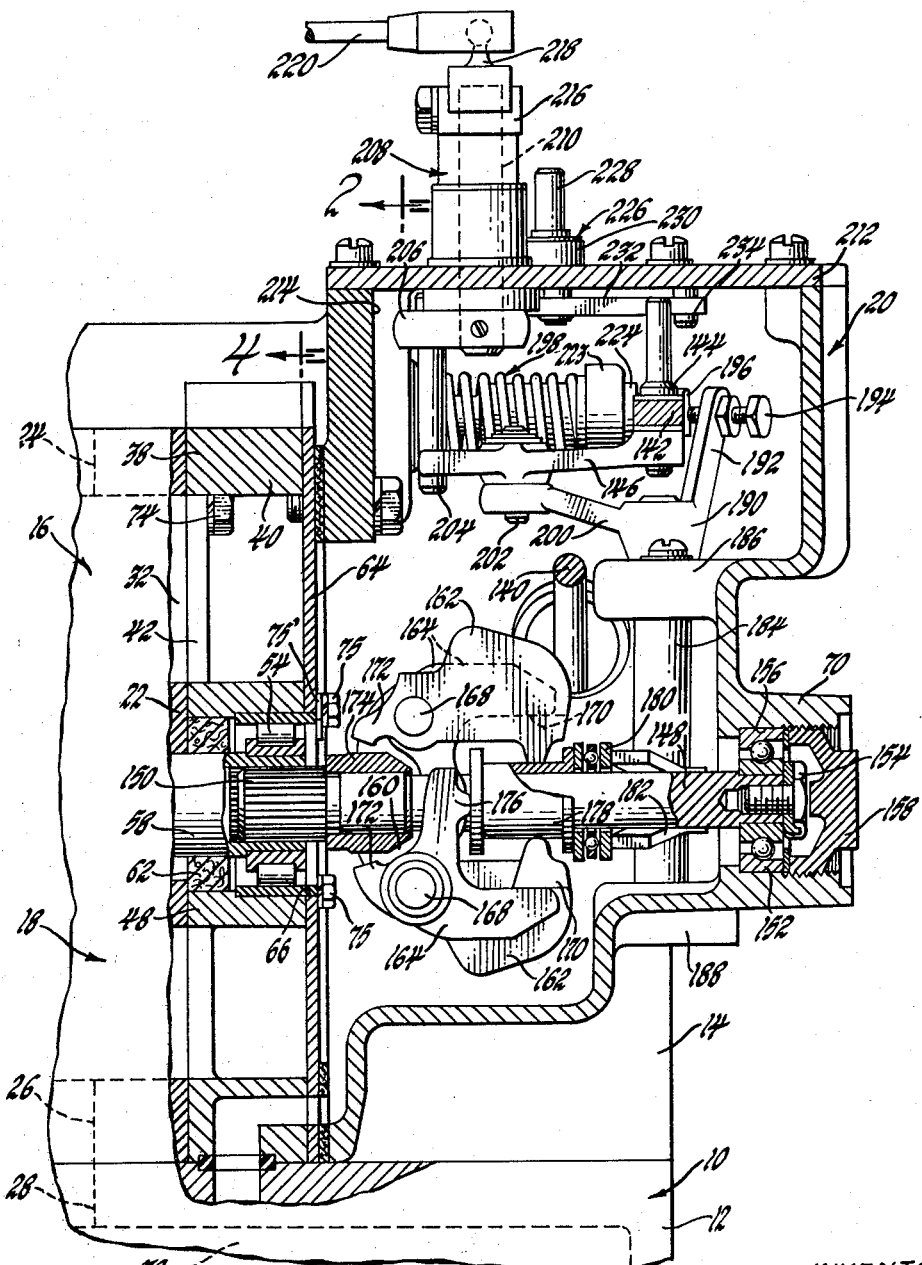
FIGURE 1 is a fragmentary view of portions of an internal combustion engine and of a compound blower and governor mechanism mounted thereon with portions broken away and in section to show a blower bypass control mechanism integrated therewith in accordance with the invention.
Figure 2:
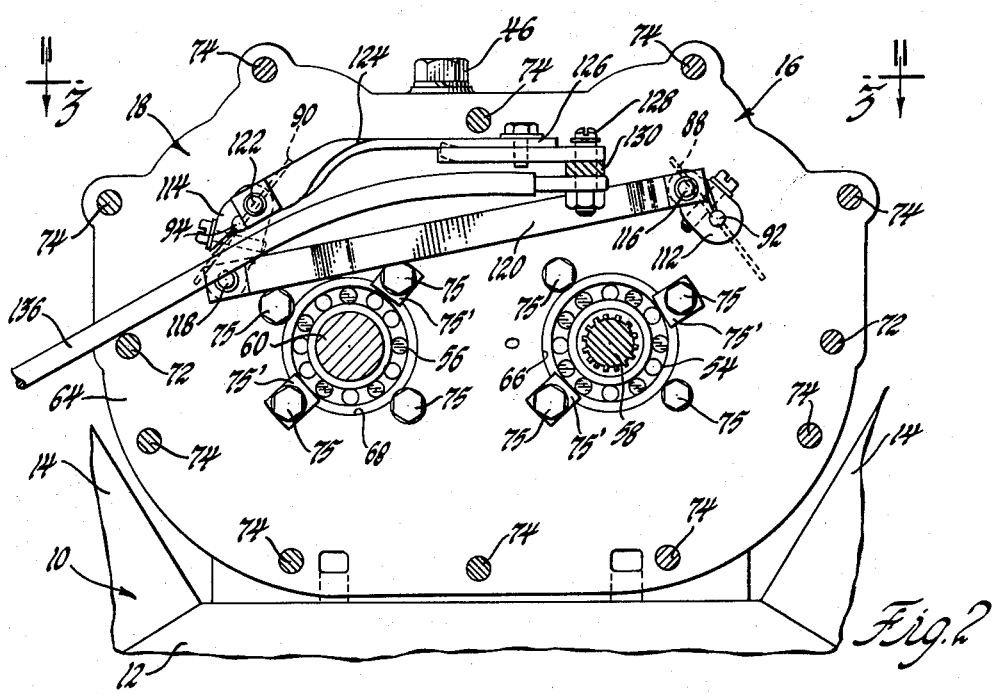
FIGURE 2 is a sectional view taken substantially in the direction of the arrows and in the plane of the line indicated at 2—2 in FIGURE 1.
Figure 3:
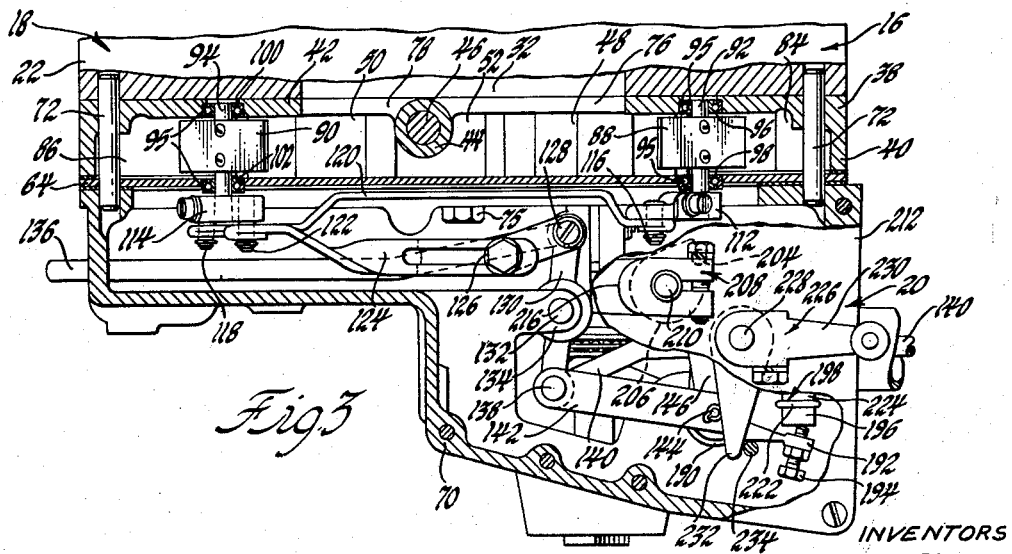
FIGURE 3 is a fragmentary elevational view of the combined blower, governor and blower bypass mechanism with portions thereof broken away and in section.
Figure 4:
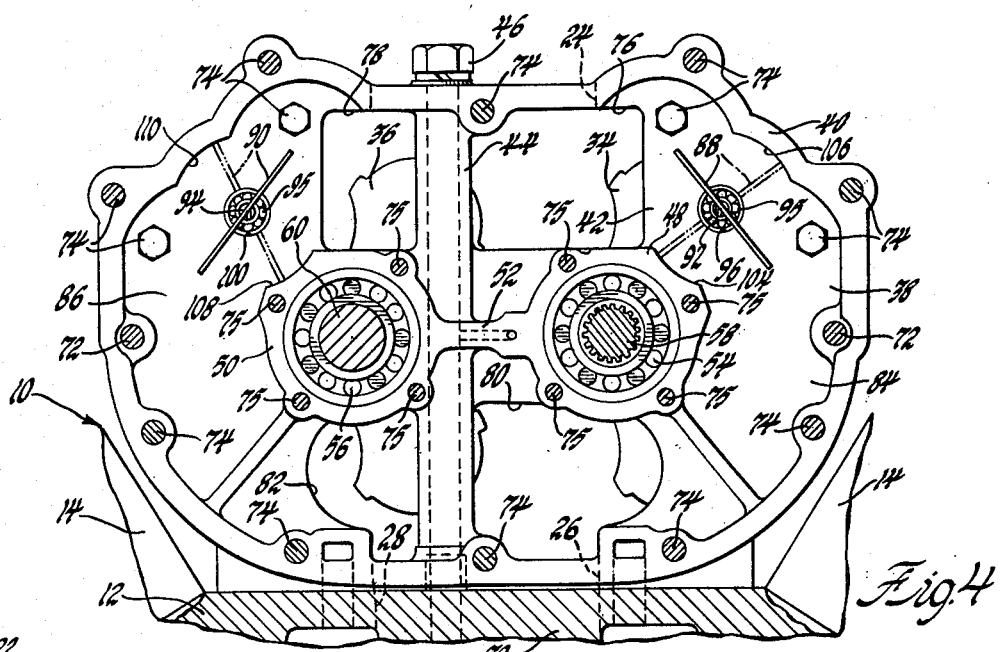
FIGURE 4 is a sectional view taken substantially in the direction of the arrows and in the plane of the line indicated at 4—4 of FIGURE 1.

As the throttle control lever 208 is advanced beyond its minimum fuel supply position, in a counterclockwise direction as viewed in FIGURE 3, the resultant counterclockwise rotation of the levers 146 and 130 increases the engine fuel supply. As engine speed increases, the low speed weights 162 are centrifuged outwardly until limiting abutment occurs between the toes 172 and the flyweight carrier hub. This movement also compresses the idle speeder spring until a boss 222 on the cap 196 abuts the adjacent end of a sleeve 223. The sleeve 223 reciprocably mounts the idler cap 196 and has an annular shoulder 224 seating one end of the high speed speeder spring 225. Further fuel increasing movement of the throttle control lever shifts the fuel control linkage in an increasing fuel direction until the centrifugal forces acting on the high speed weights 164 are in equilibrium with the compressive loading of the high speed speeder spring. Such equilibrium occurs at an engine speed corresponding to the effected positioning of the throttle control lever. After such an equilibrium forces condition has been achieved, any increase in engine speed due to removal of torque load further fuel increasing movement of the throttle control lever results in deflection of the speeder spring until a new equilibrium condition is achieved between the flyweight and speeder spring biasing forces. The corresponding counterclockwise rotation of the bell crank lever 190 carries the fuel control linkage in a decreasing fuel direction and thus limits the maximum speed of the engine to that established by the initial compressive loading of the high speed speeder spring. Fuel increasing movement of the governor output lever actuates the bypass valve controlling tie linkage 124 to the left as viewed in FIGURE 3 with resultant movement of the valves 88 and 90 toward their closed positions. The geometry of the valve linkage is preferably adjusted so that such closing occurs slightly before the fuel control means reaches its full-fuel range of operation.

A shutdown control lever 226 is pivotally mounted by the housing cover 212 and includes a pivot shaft 228. A manually actuated lever arm 230 is secured to the upper end of the pivot shaft above the cover plate and a second lever arm 232 is secured to its lower end within the governor housing. Clockwise rotation of the lever 226, as viewed in FIGURE 3, causes the lever arm 232 to engage an upward extension of the pivot pin 144 and thus carries the differential lever and fuel control linkage to no-fuel supply positions effecting engine shutdown. Such movement of the fuel control linkage of course shifts the blower bypass valves to their opened positions. The lever 232 is normally biased to a "fuel supply" permitting position in abutment with a cover mounted stop pin 234 by suitable springs associated with its control linkage, not shown.

The effective arms of the valve actuating levers 112 and 114 are preferably of different length as shown. This arm differential cooperates with proper adjustment of the link 124 and in the mounting of the levers 112 and 114 on their respective pivot shafts to permit variations in the timing and sequence of bypass valve opening. In the illustrative embodiment, the geometry is such that the valve 90 opens approximately ten degrees before valve 88. This arrangement permits modification of the blower bypass characteristic to meet the scavenging and combustion air requirements of different engine installations. The opening characteristics of the bypass valves 88 and 90 may be similarly and further modified by changing the arcuate lengths of the seal lands 104, 106 and 108, 110, respectively.

As indicated above, the throttle lever 208 is operable through the several linkages to effect the opening and closing of the bypass valves in accordance with the throttle established fuel input between the governor maintained idle and maximum speed limits. The reductions in engine air flow and air box pressure resulting during part throttle reductions in engine fuel input reduces the blower power absorption required during such operation. This is best shown by the graph of FIGURE 8 showing the blower power requirements with and without the blower bypass control mechanism of the invention for a typical six-cylinder two-cycle V-engine. The effected reduction in blower power serves to substantially increase fuel economy during such part throttle operation.

FIGURES 5 and 6 show slight modifications of the invention from that described above to provide adequate blower bypass capacity and the valve actuating controls for a tandem blower installation and a single larger capacity blower. In the following description, the several elements and portions identical with or substantially similar to those of the previously described embodiments are identified with corresponding reference numerals and need not be described in detail.

Referring now more particularly to FIGURE 5, two blowers 18 and 18' are mounted in tandem and drivingly interconnected at 236. Blower bypass defining end plates 38 are secured to the forward ends of each of the two intermediate blower housing members 22 and mate with two identical plate members 238. The plate members 238 correspond to the previously described plate member 76 except for extensions in their upper left hand corners which are best indicated at 240 in FIGURE 7. The extension of the front plate member 238 mates with a corresponding extension 241 of the governor housing member. A tube 242 is supported by and extends between aligned openings in the extension of the front plate member 238 and in a cover member 244 secured to the plate member of the rear blower. The tube 242 journals a shaft 246 which projects at its forward end into the governor housing compartment and at its rearward end into the compartment defined between the plate member 238 and the cover member 244. Two identical pinion gears 248 and 250 are secured to opposite ends of the shaft 246 and engage sector gears 252 and 254 carried by the valve actuating levers 114 of the front and rear blowers, respectively. The valve actuating lever of the rear blower is in turn connected through a link 120 to the actuating lever 112 for the other bypass controlling valve of the rear blower. The bypass valve controlling movement imparted to the front lever 114 by the throttle and governor control linkages is thus transmitted through the pinion 248, the shaft 246 and the pinion gear 250 to the rear bypass valve actuating sector gear 254 and therefrom to the rear bypass controlling valves 88 and 90.

In the modification shown in FIGURE 6, two bypass defining end plates 38 are secured to opposite ends of the blower housing member 22 and mate with plate members 238 having tube and shaft mounting extensions 240. A tube 242' extends between the two plate members and journals a shaft 246' which projects at its forward end into the governor housing compartment and at its opposite end into a compartment defined between the rear plate member 238 and a cover member 244' secured thereto. Identical pinion gears 248 and 250 are secured to the opposite ends of the shaft 246' and mate with sector gears 252 and 254 carried by two bypass valve actuating levers 114 secured to the aligned valve pivot shafts 92 and 94 journaled in the front and rear end plates and plate members. The rear valve actuating lever 114 is in turn connected through a link 120' to the actuating lever of the other bypass controlling valve of the rear end plate. The bypass controlling movement thus imparted to the front bypass valves 88 and 90 by the throttle governor control linkages is thus transmitted to the bypass controlling valves of the rear end plate for synchronous movement therewith.

From the foregoing description of several illustrative embodiments of the invention, it will be seen that the several stated objects and advantages are accomplished and that various modifications and changes might be made therefrom without departing from the spirit and scope of the invention as defined in the following claims.

What is claimed is:

1. A control mechanism for an internal combustion engine comprising a positive displacement blower including a housing defining a blower chamber and having an inlet port and an outlet port connectable to the air receiving chamber of the engine, engine driven impeller means rotatably mounted within said blower chamber and adapted to effect positive pumping displacement between the inlet and outlet ports, one end of said housing having a pressure bypass outlet port adjacent the inlet portion of the blower chamber, a pressure bypass inlet port adjacent the outlet portion of the blower chamber, and two arcuate passageways interconnecting said pressure bypass ports, two valves pivotally mounted by said housing for opposite rotation within said passageways between fully opened and closed bypass controlling positions, fuel control linkage means associated with said bypass defining end of said blower housing and normally operable to control engine speed by regulation of the engine fuel supply between minimum and maximum fuel supply conditions, a throttle control lever, means providing a lost motion connection between said lever and said fuel control linkage, centrifugal governor means mounted within said housing adjacent said bypass passageways and rotatably driven by said impeller means, said governor means being operably connected through said fuel control linkage means to modulate the engine fuel supply to maintain the engine speed established by said linkage within idle and maximum engine speed limits, and adjustable linkage means intermediate said fuel control linkage means and said bypass controlling valves and operable to vary the opening of said bypass valves between their fully closed and opened positions in accordance with decreasing fuel regulation of the engine fuel supply between governor modulated maximum and idle engine speed fuel supply limits corresponding respectively to movement of said throttle control lever and said fuel supply control linkage means between a first intermediate fuel supply controlling condition slightly less than the maximum fuel supply controlling condition and a second intermediate fuel supply controlling condition slightly above the minimum fuel supply controlling condition, opening movement of said valves between said intermediate fuel supply controlling conditions being effected independently of the idle and maximum engine speed maintaining operation of said governor means.

2. In a control mechanism as set forth in claim 1, said last-mentioned linkage means being adjustable to vary the angularly phased bypass closing relationship between said valves.

3. In combination with a pressure charged internal combustion engine, housing means defining a blower chamber and a governor mounting chamber, said housing means having an inlet port and an outlet port opening on opposite sides of said blower chamber, engine driven impeller means rotatably mounted within said blower chamber and adapted to effect positive pumping displacement between the inlet and outlet ports, said outlet port being connectable to the engine, said housing means defining two pressure bypass passages intermediate said blower and governor chambers and interconnecting the inlet port and outlet portions of the blower chamber, two valves pivotal oppositely within said passages between opened and closed positions, fuel control linkage means normally operable to control engine speed by regulation of the engine fuel supply between minimum and maximum fuel supply positions, a throttle control lever, means providing a connection between said throttle control lever and said fuel control linkage means, governor means mounted within said governor chamber and rotatably driven by said impeller means, said governor being operably connected to said fuel control linkage means independently of said throttle control lever to modulate engine fuel supply to maintain the engine speed established thereby within the governor maintained idle and maximum engine speed limits, and adjustable linkage means intermediate said fuel control linkage means and said bypass controlling valves and operable to actuate said valves between fully closed and opened bypass controlling positions in accordance with fuel decreasing regulation of the engine fuel supply between the governor maintained maximum and idle engine speed limits, said bypass controlling fully closed and opened valve positions corresponding respectively to a first intermediate control position of the fuel supply control linkage providing slightly less than the maximum fuel supply condition and a second intermediate control position providing slightly more than the minimum fuel supply condition, and opening movement of said valves between their fully closed and opened positions by actuation of said throttle control lever being effected independently of the idle and maximum engine speed maintaining operation of said governor means.

4. In combination with an internal combustion engine, a positive displacement blower for pressure charging the engine including engine driven impeller means adapted to effect positive air pumping displacement between an inlet port and an outlet port connected to the engine, a pressure bypass passage means interconnecting the inlet and outlet portions of the blower, valve means pivotal within said passage means between fully opened and closed bypass controlling positions, fuel control linkage means, a throttle control lever, means providing a lost motion connection between said throttle control lever and said fuel control linkage means, said fuel control linkage means being normally operable to regulate engine fuel supply between minimum and maximum fuel supply controlling conditions, centrifugal governor means rotatably driven by said impeller means and operably connected through said fuel control linkage means to regulate engine fuel supply to maintain idle and maximum engine speed limits, and said linkage means being operably connected to effect opening of said valve means between its fully closed and opened bypass controlling positions in accordance with fuel decreasing regulation of the engine fuel supply by said fuel control linkage means between intermediate fuel supply controlling positions corresponding to governor maintained maximum and idle engine speed fuel supply limits, the movement of said valve by said linkage means between its fully closed and opened positions being effected independently of said governor means.

5. In combination with an internal combustion engine, a blower for pressure charging the engine including impeller means adapted to effect air pumping displacement between a blower inlet and an outlet connected to the engine, a pressure bypass interconnecting the blower inlet and outlet, valve means including a valve member operable to control air flow through said bypass and movable through opened and closed ranges of movement, fuel control means normally operable to regulate engine fuel supply between minimum and maximum fuel supply controlling conditions, a throttle control linkage, means connecting said throttle control linkage to said fuel control means, governor means responsive to engine speed and operably connected independently of said throttle control lever through said fuel control means to regulate engine fuel supply to maintain idle and maximum engine speed limits, and said fuel control means being operably connected to effect opening movement of said valve member independently of the idle and maximum engine speed maintaining operation of said governor and in accordance with fuel decreasing regulation of the engine fuel supply between an intermediate fuel supply controlling condition slightly less than the governor regulated maximum engine speed maintaining fuel supply conditions and a fully opened position corresponding to its minimum fuel supply controlling condition, the governor means being operable to maintain the engine at its idle speed limit.

6. In the combination set forth in claim 5, said fuel control being operably connected to maintain the bypass controlling valve member in its closed range of movement during operation of the fuel control means between said maximum and intermediate fuel supply controlling conditions.

References Cited in the file of this patent

UNITED STATES PATENTS 2,891,524    Scheiterlein _____ June 23, 1959

FOREIGN PATENTS 837,488    Germany _____ Apr. 28, 1952